July 24, 1928.
A. BAYARDI ET AL
1,678,239
METHOD OF MANUFACTURING JOINTED JEWELRY
Filed March 10, 1925
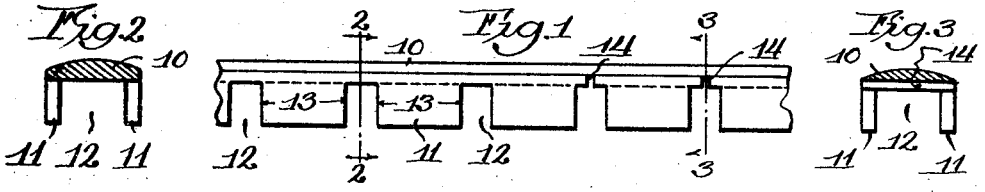
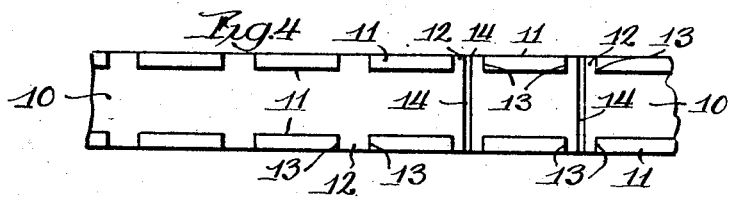
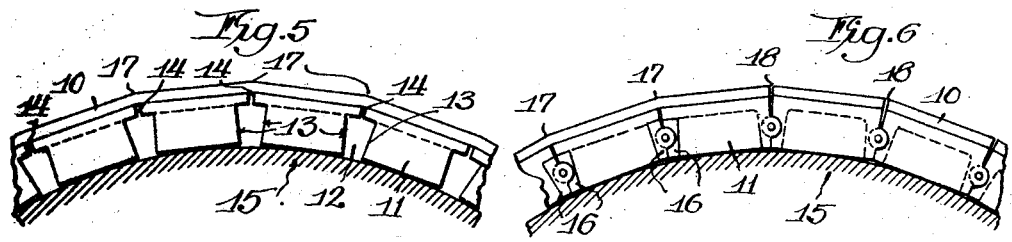
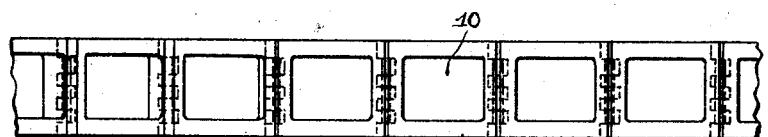
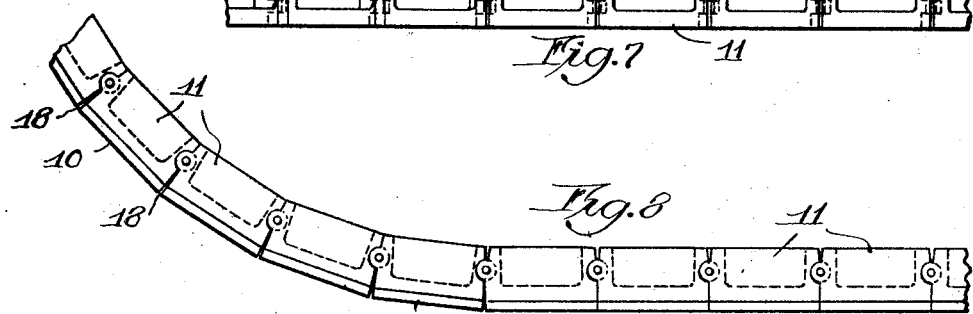
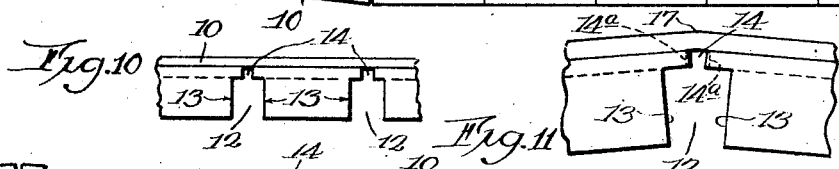
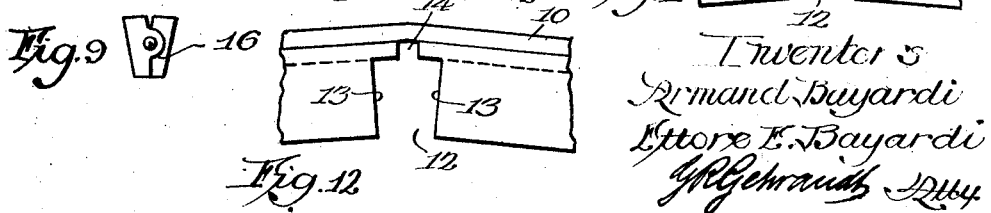
Inventors
Armand Bayardi
Ettore F. Bayardi Patented July 24, 1928.

1,678,239

UNITED STATES PATENT OFFICE.

ARMAND BAYARDI AND ETTORE E. BAYARDI, OF CHICAGO, ILLINOIS.

METHOD OF MANUFACTURING JOINTED JEWELRY.

Application filed March 10, 1925. Serial No. 14,385.

Heretofore in the manufacture of jointed jewelry and especially when the article is composed of a plurality of sections arranged end to end and pivotally connected together by the application of a hinge member secured to the proximate faces of adjacent members or sections, considerable difficulty has been experienced for the reason, among others, that the hinge elements must of necessity be comparatively small and as the hinges are usually secured to the sections by welding, brazing or soldering, considerable heat is necessary, with the result that the operation is rather delicate and necessitates considerable time, especially if there are a number of sections to be thus connected, and in order to secure accuracy of manufacture.

It is one of the objects of the present invention to overcome these difficulties and objections and to provide an improved method of manufacturing jointed jewelry by means of the use of which method a piece of jewelry of the same length and same number of sections may be manufactured in considerably less time than heretofore and with the sections secured together more compactly and with more accuracy, with the result that a much stronger, better, and more rigid construction of a very flexible nature will be produced at a much less cost of manufacture, which is accomplished by reason of the fact that with the present method the necessity of cutting the integral bar into pieces and taking them apart, which has heretofore exacted extreme carefulness, has been eliminated. The cutting of the bar heretofore has been necessary for the purpose of taking up the spaces made by the saw. In the present method handling is facilitated, and the amount of labor reduced, and at the same time handling of each piece will be avoided, resulting in a much superior finished article.

A further object is to provide an improved method of manufacturing an article of this character in which the sections will be pivotally connected together in such a manner that when in the form of a bracelet or the like and about the arm, there will be formed a very small space between adjacent sections and which spaces will be closed or invisible when the sections are straightened and the article will then have the appearance of a solid bar.

To the attainment of these ends and the accomplishment of other new and useful objects as will appear, the invention consists in substantially the construction, combination and arrangement of the several parts and in substantially the herein described method of carrying this invention into operation and as diagrammatically illustrated in the accompanying drawing, and in which drawing, Figure 1, is a view in side elevation of an integral bar, the left hand end of the bar illustrating the first step and the right hand end illustrating the second step in the operation.

Figure 2, is a detail sectional view taken on line 2—2 Figure 1.

Figure 3, is a detail sectional view taken on line 3—3 Figure 1.

Figure 4, is a bottom plan view of Figure 1.

Figure 5, is a view of the third step in the operation showing the bar or body member bent to form the hinge recesses or seats.

Figure 6, shows on the left hand side the fourth step in the operation after the hinge members have been placed in position in their seats and welded or soldered; the right hand end shows the final step in the operation before the article is removed from the mandrel.

Figure 7, is a bottom plan view of the completed article.

Figure 8, is a side elevation of the completed article illustrating the flexibility of the completed article.

Figure 9, is a detail end elevation of one of the hinges.

Figures 10, 11, and 12 are enlarged detail elevations showing the different steps in the shaping of the bar.

In carrying this invention into operation there is first provided an integral bar preferably of channel formation having a body 10 and spaced side members 11, all of which may be of any desired size, configuration and length.

In the sides 11 are arranged at desired intervals, and preferably uniformly spaced, hinge receiving recesses 12 of any desired depth to terminate preferably flush with the inner face of the body portion 10, and the side walls 13 of these recesses are substantially parallel throughout their length.

Kerfs or grooves 14 are then cut in the bottom of the recesses 12 centrally thereof and of a width considerably less than the width of the recesses. These kerfs or grooves 14 extend into the body portion 10 of the bar for any desired depth, but are preferably of a depth to extend substantially half way through the body portion 10 and the grooves extend transversely of and entirely across the body portion.

The portion of the material in the body 10 of the bar between the bottom of the groove or kerf and the outer surface of the body, forms a fulcrum or pivot, so that when the bar is then bent or shaped about the mandrel 15, the adjacent sections of the bar, or the portions between adjacent recesses, will be bent with respect to each other.

As the bar is bent around the mandrel 15, from the straight position, as shown in Figures 1 and 10, the bodies of the adjacent portions between the recesses 12 and grooves 14 will be always maintained straight, and during such bending operation, the side walls of the recesses 12 will be caused to converge from the bottoms of the recesses outwardly as shown more clearly in Figure 11.

At the same time this bending or shaping of the bar will cause the side walls 13 of the recesses 12 to converge from the base of the recesses 12 to form substantially key stone shaped recesses and into which recesses the hinge member 16 is inserted through the end of the recess and laterally with respect to the bar 10.

After the bar has been thus shaped the side walls of the recesses 14 are cut away along the lines 14ª so that they will be substantially parallel.

By reason of the shape of the recesses 12 it will be manifest that the hinge members will be held in position and against dropping out of position. The groove or kerf 14 will, when the hinge members are inserted, stand in alinement with the knuckles of the hinge and will register with the space between the hinge members, the hinge knuckles being preferably spaced intermediate the top and bottom of the hinge members to form such space.

After the hinges are thus inserted they are welded or soldered so that the hinge plates will in reality form a homogeneous mass with the respective proximate faces of adjacent sections.

Before the hinges are placed in position and after the bar has been shaped around the mandrel, the ends of the bar may be fastened together such as by welding or soldering.

The hinges are inserted in the recesses 12 without the pivot or pintle pin, that is the pin is withdrawn before the hinge is inserted, so that during the welding or soldering operation the pivot pin will not be affected by the heat. It has been found that during this portion of the operation the heat seriously interferes with the pin due to the expansion of the metal thereby causing the pin to bind. By removing the pin and completing the welding or soldering operation and then inserting the pivot pin, these objections and difficulties will be avoided.

After the hinge has been thus secured in position and the pivot pin inserted, the latter may be secured against displacement by welding or soldering the ends of the pin.

After the hinges have been secured in position, and as illustrated at the left hand end of Figure 6, the bar 10 is then cut along the lines 17 and which lines will be formed by the bending step of the method, and when the cuts are made along this line 17 the bar will be severed as at 18 in alinement with the hinge knuckle and the space which is formed between the leaves or plates of the hinge member, before the latter became an integral part of the respective adjacent ends of the bar sections.

By removing portions of the side walls of the recesses 14 so as to cause these walls to be substantially parallel, it is only necessary to provide a small cut through the bar along the lines 17 so that a very small or narrow opening between adjacent sections of the bar will be formed, as shown at 18 in Figures 6, and 8, with the result that when the pivotally connected sections are straightened with respect to each other, the spaces 18 will be entirely closed and become invisible as shown in Figure 8, and with the further result that when the article is opened or laid flat upon a support for show or other purposes, it will have the appearance of a solid bar.

The ends of the article after being removed from the mandrel are separated and suitable fastening or securing devices may then be attached in any desired manner to such ends.

With this improved method considerable time will be saved in the manufacture of an article of this character and an article which is cheap to manufacture will be provided and at the same time result in accuracy of manufacture, strength, and rigidity of construction.

Furthermore, the pivotally connected sections of the bar will be maintained against lateral movement with respect to each other yet the article will be very flexible.

When the article is in use or is being worn, the objectionable large space between the sections will be obviated and instead thereof there will be very small spaces between the sections and when the sections are opened to produce a substantially flat bar, the joints or spaces between the sections will be closed and become invisible and the article will have the appearance of a solid bar.

What is claimed as new is:

1. The method of manufacturing jointed jewelry from an integral channel shaped bar to produce a plurality of sections pivotally connected, which consists in forming hinge receiving recesses in and extending through the walls of the channel in the bar, the walls of the recesses being substantially parallel, then bending the bar to cause the recess walls to converge from the base of the recesses outwardly for temporarily holding against displacement hinge plates that are inserted in said recesses, then securing the hinge members in said recesses, and then severing the bar in alinement with the knuckle of the hinge.

2. The method of manufacturing jointed jewelry from an integral bar to provide a a plurality of sections pivotally connected, which consists in forming a plurality of spaced hinge receiving recesses in and extending partially through the bar with the side walls of the recesses substantially parallel, then bending the bar adjacent the recesses to cause the side walls of the recesses to converge from the bottom of the recesses outwardly to temporarily hold hinge plates, securing the hinge plates in said recesses, and then severing the bar in alinement with the knuckles of the hinges.

3. The method of manufacturing jointed jewelry from an integral bar to provide a plurality of sections pivotally connected together, which consists in forming hinge receiving recesses in and extending partially through the bar, then cutting into and partially through the bar at the bottom of the recesses to facilitate the bending of the bar, then bending the bar to cause the walls of the recess to converge from the bottom of the recesses outwardly, then securing hinge plates in said recesses, and then cutting through the bar in alinement with the cut at the bottom of the recesses to sever the bar into sections.

4. The method of manufacturing jointed jewelry from an integral channel shaped bar to provide a plurality of sections pivotally connected together, which consists in forming hinge recesses in and extending partially through the walls of the channel in the bar, then cutting into and partially through the bar at the base of the recesses to facilitate the bending of the bar, then bending the bar to cause the walls of the recesses to converge from the bottoms of the recesses outwardly, then placing co-operating and disconnected hinge plates in each of the recesses, securing the plates in the recesses, then inserting a pivot pin in the registering knuckles of the hinge plates and then cutting through the bar in alinement with the cut in the bottoms of the respective recesses.

5. The steps in the method of preparing an integral bar for the manufacture of jointed jewelry, which consists in forming a plurality of hinge recesses in and extending partially through the bar, and with substantially parallel sides, then cutting partially through the bar at the bottoms of the recesses, and then bending the bar adjacent the last recited cuts to cause the walls of the respective recesses to converge towards each other from the bottoms of the respective recesses and outwardly.

6. The method of preparing an integral bar for the manufacture of jointed jewelry, which consists in forming a plurality of hinge recesses in and extending partially through the bar, and with substantially parallel sides, then cutting partially through the bar at the bottoms of the recesses, then bending the bar adjacent the last recited cuts to cause the walls of the respective recesses to converge towards each other from the bottoms of the recesses outwardly, then inserting hinge plates into the recesses through the ends thereof, securing the hinge plates in the recesses and then cutting through the bar in alinement with the cut in the bottom of the recesses.

7. The steps in the method of preparing an integral bar for the manufacture of jointed jewelry, which consists in forming a plurality of hinge recesses in and extending partially through the bar and with substantially parallel side walls, then forming grooves partially through the bar at the bottom of the recesses, then bending the bar at points adjacent the said grooves to cause the side walls of the grooves to converge from the bottoms of the grooves outwardly, and then shaping the said walls of the grooves to cause them to be substantially parallel.

8. The steps in the method of preparing an integral bar for the manufacture of jointed jewelry, which consists in forming a plurality of hinge recesses in and extending partially through the bar and with substantially parallel side walls, then forming grooves partially through the bar at the bottom of the recesses, then bending the bar at points adjacent the said grooves to cause the side walls of the grooves to converge from the bottoms of the grooves outwardly, and then cutting away portions of the side walls of the grooves to cause them to be substantially parallel.

9. The steps in the method of preparing an integral bar for the manufacture of jointed jewelry, which consists in forming a plurality of hinge recesses in and extending partially through the bar and with substantially parallel side walls, then forming grooves partially through the bar at the bottom of the grooves to cause the side walls of the grooves to converge from the bottom of the grooves outwardly, and then cutting away from the inside of the recesses, portions of the side walls of the grooves to cause them to be substantially parallel.

In testimony whereof, we have signed our names to this specification on this 2nd day of March, 1925.

ARMAND BAYARDI.
ETTORE E. BAYARDI.